June 25, 1963 R. E. HILEMAN ETAL 3,095,509
SWITCHING CIRCUITS
Filed May 19, 1960
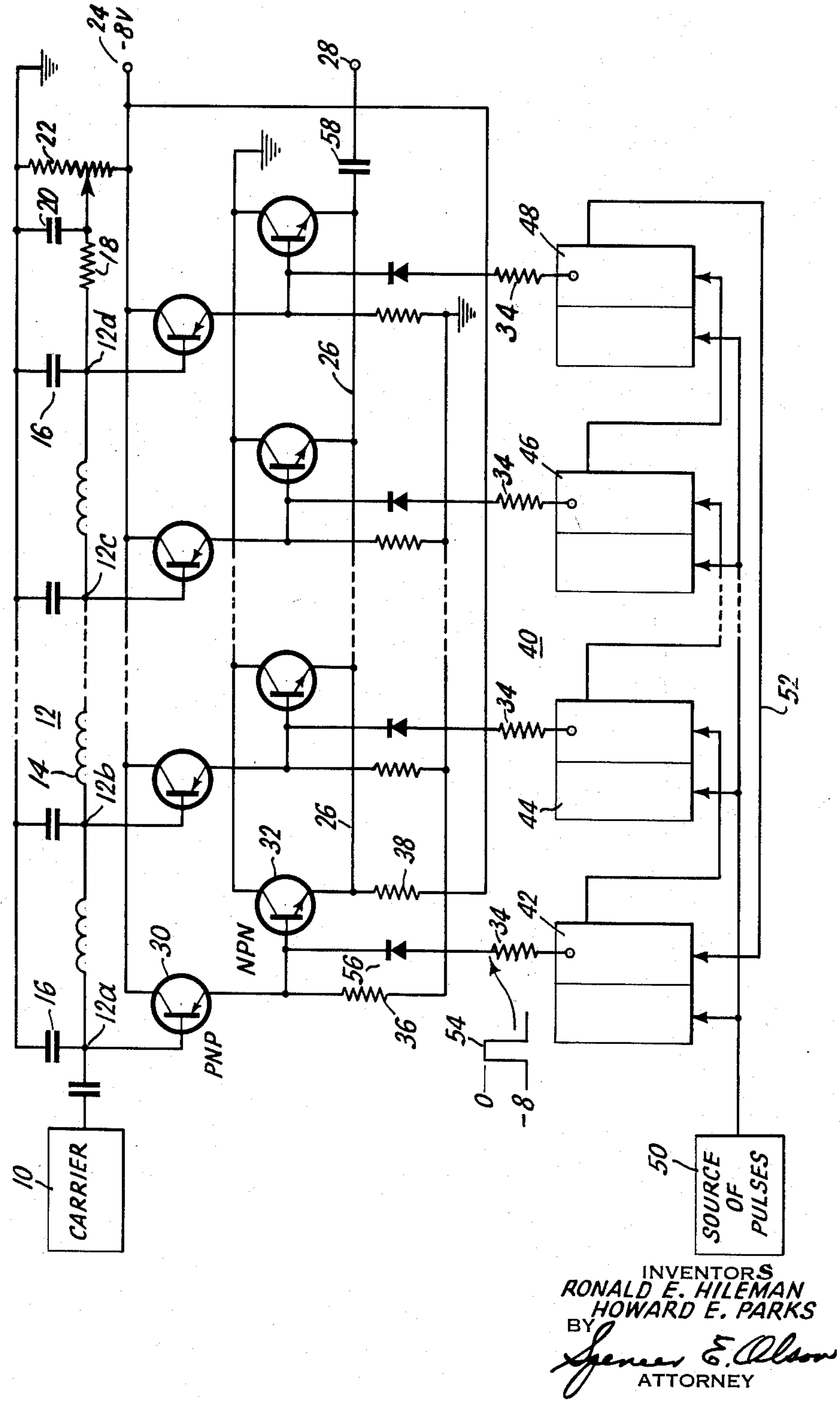
INVENTORS
RONALD E. HILEMAN
HOWARD E. PARKS
BY Spencer E. Olson
ATTORNEY 3,095,509
Patented June 25, 1963

1

3,095,509

SWITCHING CIRCUITS

Ronald E. Hileman, Williamsville, and Howard E. Parks, Buffalo, N.Y., assignors to Sylvania Electric Products, Inc., a corporation of Delaware Filed May 19, 1960, Ser. No. 30,262
5 Claims. (Cl. 307—88.5)

This invention relates to apparatus for generating an output signal having a selectable constant frequency deviation from the frequency of a carrier signal, and more particularly to switching circuits for use with such apparatus for minimizing the generation of undesirable transients in the output signal.

In a number of communication systems known to the art, it is necessary to provide a plurality of carrier signals of different frequency, each related to the other in a specified manner. For example, in some systems with which applicant is familiar, it is necessary to rapidly switch from one frequency to the other in some programmed or pseudo-random fashion, not necessarily from one channel to an adjacent channel. That is, it may be necessary to shift from a frequency near the lower edge of a band of frequencies to a channel near the upper edge of that band, and then back to a channel near the middle of the band, and so on.

An eminently suitable circuit for generating signals having the foregoing characteristics is described in Pat. No. 2,923,891 of Madison G. Nicholson, Jr. entitled "Generator of Frequency Increments," and assigned to the assignee of the present application. Basically, the apparatus described in this patent comprises a source of unmodulated carrier signals, means for producing from the unmodulated carrier a plurality of carriers each having a frequency identical with that of the unmodulated carrier but having discrete phase differences over the range from a zero reference phase through 360 electrical degrees at the carrier frequency. These phase-displaced carrier signals are conveniently produced by a multi-section delay line to one end of which the carrier signal is applied. The apparatus further includes a plurality of switches, equal in number to the taps on the delay line, each controlling a respective one of the progressively phase-displaced carrier waves. Each of the switches is connected to an output circuit and is operative to transmit the respective applied carrier wave to the output terminals only in response to the application thereto of a unique switching signal. A switching signal having characteristics so as to actuate the switches in a unidirectional sequence from one end of the delay line to the other is applied in parallel to the switches whereby during each full cycle of the switching signal the progressively displaced carrier waves are sequentially coupled to the output circuit. Thus, if the switches are actuated in the direction of progressively retarded phase, one cycle per second is subtracted from the frequency of the original unmodulated carrier wave for each complete cycle of the switching signal. So long as the switching signal is continuously applied, the frequency of the signal appearing at the output terminals differs from the frequency of the unmodulated carrier by an amount equal to the frequency of the switching signal. For example, if the frequency of the unmodulated carrier signal were one megacycle; i.e. one million cycles per second, and the switching signal has a frequency of one thousand cycles per second, and as before, assuming a switching direction in the direction of progressive phase retardation, the resultant output signal would have a frequency of 999,000 cycles per second. To obtain a different frequency, the frequency of the switching signal is changed; for example, if it were desired to generate an output signal having a frequency of 995,000 cycles per second, the frequency of the switching signal would simply be changed to 5000 cycles per second.

2

In one embodiment of the apparatus, illustrated in FIG. 1 of the aforementioned patent, the switches for coupling the taps on the delay line to the output circuit each consist of two diodes per delay line tap, two fixed bias supplies per switch, and a staircase or sawtooth voltage generator for providing a suitable switching signal to effect unidirectional switching of the taps from one end of the delay line to the other. The coaction between the switching signal and the biases on the diodes insures that each time a full 360 degrees of phase shift is reached, the output frequency has been changed by one cycle, increased or decreased depending upon the direction of switching along the line. As a consequence, the carrier frequency is modulated in linear steps depending upon the speed with which the switching signal is cycled. It is essential to this operation that the output be switched quickly and cleanly with as little transient as possible. It has been found, however, that a switching waveform of sawtooth or saircase shape has the effect of causing the diodes to switch gradually from the non-conducting to the conducting state introducing the sum of two stages of the delay line in the final output during the transition from one switch to the next in the unidirectional sequence. This slow switching introduces transients and causes the output signal to contain frequencies other than that of the carrier plus or minus the frequency of the switching signal. Moreover, this system requires a stable sawtooth or staircase voltage generator and numerous bias voltages which must be accurate and stable over long periods of operation.

In another embodiment, shown in FIG. 4 of the above-identified Nicholson patent, switching is accomplished by a single diode per delay line tap, the diodes being successively actuated by a magnetic beam switching tube. This system afforded a considerable simplification in the circuitry necessary to accomplish the switching function in that the series of accurate bias voltages and the matrix necessary to generate the staircase voltage are not required. It has been found, however, that the output signal has a high harmonic content, and the static capacitance of the diode elements reduces the output level by coupling some of each of the phases into the output bus. In addition, the transient switching voltage is capacitively coupled into the output circuit.

Switching transients are essentially eliminated at switching speeds below one hundred kilocycles by using gating circuits each consisting of a pair of serially connected oppositely poled diodes connected between the taps on the delay line and a common output bus as described and claimed in the copending application S.N. 30,676 of Vincent C. Oxley filed May 20, 1960, entitled "Low Speed, Low Transient Switching Devices," and assigned to the assignee of the present application. Beyond this frequency, however, switching transients become an appreciable portion of the output signal necessitating a faster, transient free switch between the delay line taps and the output line.

With an appreciation of the foregoing limitations in the operation of the patented linear modulator circuit, applicant has as a primary object of the present invention to improve the operation of this type of apparatus.

A more specific object of the invention is to provide a gating or switching means for coupling the taps on the delay line to the output circuit which minimize the introduction of undesirable transients into the output signal at switching rates exceeding about one hundred kilocycles per second.

In the attainment of these objects, the gating circuit in accordance with the invention, one of which is provided for each tap of the delay line, comprises a pair of serially connected transistors, one a PNP type connected as an emitter follower, with its base connected to the delay line, and the other an NPN type also connected as an emitter follower, with its base connected to the emitter of the first and its emitter connected to a common output line. The gates are successively actuated by switching pulses supplied, for example, from successive bistable stages of a ring counter and applied through a diode to the emitter-base junction of the transistors which simultaneously turn on both transistors. With this arrangement, the current change seen at the delay line tap during switching is only the base current of the PNP transistor, which is roughly $1/B$ of the gating current in the system described in the aforementioned copending application, B being the current gain of the transistor. The reduced current drawn from the delay line by the gate reduces the switching transients, and hence the harmonics in the output due to switching transients, but does not affect the coupling to the output line of the phase displaced carrier signals. When both transistors are off, there is essentially complete isolation between the output line and the delay line because the path is through two reverse-biased transistors.

Other objects, features, and advantages of the invention and a better understanding of the operation thereof, will be had from the following detailed description taken in conjunction with the accompanying drawing, the single FIGURE of which is a schematic diagram of the switching circuit in association with a lumped constant delay line, and wherein switching impulses are derived from a ring counter.

Referring to the drawing, there is shown a source of carrier signal 10 which may be, for example, a modulated or unmodulated CW signal of a selected frequency. The output of the carrier source 10 is applied to one end of a lumped constant delay line 12 consisting of a plurality of $\pi$ sections each including an inductance 14 and a capacitor 16. For clarity, only three sections (with four taps) are shown. Practical circuits commonly have eight or ten taps. The line is terminated by series resistor 18, the resistance value of which is equal to the characteristic impedance of the entire line as viewed from the terminated end. Shunt capacitor 20 provides an A.C. ground for resistor 18. Each of the sections of the line is designed to give the same phase displacement increment, a line having nine sections (ten taps), for example, each giving a delay of thirty-six electrical degrees at the carrier frequency. The terminated end of the line is connected to a source of direct current bias potential, represented by the tap of the variable resistor 22, of magnitude, by way of example, of −4 volts. Variable resistor 22 is connected between ground and a source of direct current potential, represented by terminal 24, of magnitude, by way of example, of −8 volts.

In accordance with the teaching of the aforementioned patent, the taps 12*a*, 12*b*, 12*c*, and 12*d* of the delay line are successively coupled to an output line 26 having a terminal 28 through successively actuated gating circuits connected between the taps and the output line. In accordance with the present invention, each gating circuit includes a pair of transistors 30 and 32 of PNP and NPN types, respectively, connected in series between a tap of the delay line and the output line 26. In order to isolate the output line from the delay line and keep loading to a minimum, the PNP transistors 30 are connected as emitter followers, with the base connected to the delay line taps and the collector connected to the source of negative potential at terminal 24. The emitter of the PNP transistor is connected to the base of the NPN transistor 32, also connected as an emitter follower, with its collector grounded and its emitter connected to the output line 26. The emitters of transistors 30 have individual resistors 36 connected between the emitter and ground. The emitters of all of transistors 32 are connected through a common resistor 38 to the source of negative potential at terminal 24.

With the above-described connections, the collector of the PNP transistors 30 is at −8 volts and its emitter is also normally at −8 volts and its base is at −4 volts keeping the transistor in the "off" condition. The NPN transistors 32 likewise are in the "off" condition because its base is at −8 volts and its emitter is at −4 volts since one gate is always connecting the delay line to output line 26. Thus, in the quiescent condition, each tap of the delay line is isolated from the output line 26 by two reverse-biased transistors. The gating circuits are progressively actuated, starting at one end of the delay line and going in one direction to the other, and then starting again at the said one end of the line, by applying gating pulses in sequence to the junction of the emitter of transistor 30 and the base of transistor 32. Suitable actuating pulses are conveniently obtainable from a ring counter 40, shown in block diagram form, consisting of a plurality of bistable stages 42, 44, 46 and 48 equal in number to the taps in the delay line 12, to one side of which pulses are applied in parallel from a source of pulses 50. The stages are interconnected in a manner well known to the art, the final stage 48 being connected back to the first stage over conductor 52 whereby the counter cycles from one end to the other and starts again at the initial stage upon application of pulses from the source 50. For operation with a switching circuit biased as described above, the stages of the counter 40 are so designed that when the right hand side of the bistable stage is non-conducting the point of connection thereto is at a potential of −8 volts, and produces a positive going pulse 54 at the output terminal when the right hand stage is conducting. Consequently, as a pulse advances through the counter, the positive pulse 54 successively appears at the output of stages 42, 44, 46 and 48, and then reappears at the output of stage 42. For compatibility with the herein disclosed gating circuitry, the counter is preferably transistorized, a suitable circuit for the purpose being illustrated in detail in the aforementioned Oxley application.

The output pulses from the counter stages are coupled through a fast recovery diode 56, such as a 1N626, the cathode of which is connected to the emitter of transistor 30 and the base of transistor 32. Thus, when a pulse appears at the output of stage 42, it turns both the PNP and the NPN transistors on simultaneously by raising the emitter voltage of the PNP transistors 30 and the base voltage of the NPN transistor 32. A series resistor 34, connected between the counter output and the anode of diode 56, provides suitable bias current. With the serially connected transistors both conducting, the signal appearing at the tap 12*a* is gated directly to the output line 26 and coupled through capacitor 58 to the output terminal 28. For best operation, the PNP emitter follower must have a frequency response high enough to pass the frequency of the signal from carrier source 10, and the output NPN transistor 32 must have low input capacity and fast rise time. In short, the characteristics of the transistors and their associated circuitry must be chosen such that a gating change will take place with sufficient rapidity for the signal on the delay line to follow the turn on rise time and turn off fall time of the pulse 54. As the pulse advances to the next stage 44, the first gating circuit is turned off and the phase displaced carrier signal appearing at tap 12*b* is coupled to the output line 26, this signal lagging in phase by 36 degrees from the preceding tap 12*a*. Thus, during each switching cycle across the full length of delay line 12, 360 degrees at the frequency of the carrier, or one cycle, is subtracted from the frequency of the carrier. Conversely, if the counter circuit were modified to cause switching in a direction from the terminated end toward the input end, one cycle would be added to the carrier during each switching cycle. Accordingly, it is possible to obtain at the output terminal 28 a signal having a selectable constant frequency deviation from the frequency of source 10 by varying the frequency of the pulses from source 50 applied to the counter, the frequency deviation being equal to the frequency of the pulses from source 50 divided by the number of gating circuits. The herein disclosed gating circuitry is particularly useful at switching rates in excess of 100 kilocycles per second, thus permitting deviations in output frequency from the carrier in excess of 100 kilocycles per second.

From what has been said, this rate of switching is obtainable without the introduction of undesired transients at the output terminal by reason of the serially connected emitter followers. The current change seen at the delay line tap (12_a_ for example) during switching, is only the base current of the PNP transistor 30 which is roughly only 1/_B_ of the gating current of the system described in the aforementioned Oxley application, B being the current gain of the transistor 30. This reduced current drain from the delay line reduces the switching transients, which, in turn reduces the harmonics in the output due to the switching transients. The second emitter follower 32 lowers the impedance level of the output line 26 to thereby reduce stray capacitance effects which have been found troublesome in previous gating systems which had a high impedance level at the output. Finally, when a particular gating circuit is off, it affords almost complete isolation between the output line 26 and the delay line because the path is through two reverse-biased transitsors.

While a transistorized ring counter has been suggested, other forms of counters or commutators may be employed to supply sequential actuating pulses to the diodes 56. Also, it is contemplated that negative going pulses 54 might be used to effect gating by reversing the transistors and the bias voltages thereon.

While there has been shown and described what is at present considered a preferred embodiment of the invention, it will be obvious to those skilled in the art that various changes and modifications may be made therein without departing from the invention as defined by the appended claims.

What is claimed is:

1. For use in apparatus for generating an output signal having a desired constant deviation frequency from a predetermined carrier frequency which includes a tapped delay line to one end of which the carrier signal is applied and an output line to which said taps are connected in unidirectional sequence, a gate circuit operative when energized to couple a tap on said delay line to said output line comprising, in combination, first and second transistors of opposite conductivity type each having emitter, collector and base electrodes, means connecting said transistors in series between the tap on said delay line and said output line with the emitter electrode of said first transistor directly connected to the base electrode of said second transistor, and with the base electrode of said first transistor and the emitter electrode of said second transistor connected to said tap and said output line, respectively, first and second sources of potential, said first source being positive relative to said second source, separate means connecting the emitter electrode of said first transistor and the collector electrode of said second transistor to said first source of potential, separate means connecting the collector electrode of said first transistor and the emitter electrode of said second transistor to said second source of potential, and means connected to the emitter electrode of said first transistor and the base electrode of said second transistor for applying thereto a positive pulse of sufficient amplitude simultaneously to cause both said transistors to conduct for the period of the pulse.

2. The gate circuit of claim 1 wherein said first transistor is of the PNP-type and said second transistor is of the NPN-type.

3. A gate circuit for coupling a tap on a delay line to an output line comprising, in combination, first and second transistors of opposite conductivity type each having emitter, collector and base electrodes, means connecting the base electrode of said first transistor to said delay line tap, means connecting the emitter electrode of said second transistor to said output line, means directly connecting the emitter electrode of said first transistor to the base electrode of said second transistor, means respectively connecting the emitter electrodes of said first and second transistors through first and second emitter resistors to first and second sources of potential, respectively, said first source being positive relative to said second source, means respectively connecting the collector electrodes of said first and second transistors to said second and first sources of potential, and means connected to the emitter electrode of said first transistor and the base electrode of said second transistor for applying thereto a positive pulse of sufficient amplitude to cause both transistors to conduct simultaneously for the period of the pulse.

4. A gate circuit comprising first and second transistors of opposite conductivity types each having base, emitter and collector electrodes, separate means respectively connecting the emitter electrodes of said first and second transistors through first and second resistors to first and second sources of potential, respectively, said first source of potential being positive relative to said second source, separate means connecting the collector electrodes of said first and second transistors to said second and said first sources of potential, respectively, means directly connecting the emitter electrode of said first transistor to the base electrode of said second transistor, an output terminal connected to the emitter electrode of said second transistor, and means connected to the emitter electrode of said first transistor and the base electrode of said second transistor for applying thereto a pulse of sufficient amplitude simultaneously to cause both said transistors to conduct for the period of the pulse to thereby transmit to said output terminal, during the pulse period, a signal applied to the base electrode of said first transistor.

5. A gate circuit comprising, in combination, a first transistor of one conductivity type having base, emitter and collector electrodes, a second transistor of opposite conductivity type having base, emitter, and collector electrodes, the emitter electrode of said first transistor being directly connected to the base electrode of said second transistor, and through a first resistor to a first source of reference potential, means directly connecting the collector electrode of said first transistor to a second source of potential negative with respect to said first reference potential, means directly connecting the collector electrode of said second transistor to said first source of reference potential, means connecting the emitter electrode of said second transistor through a second resistor to said second source of potential, an output terminal connected to the emitter electrode of said second transistor, and means connected to the emitter electrode of said first transistor and the base electrode of said second transistor for applying thereto a pulse of sufficient amplitude simultaneously to render both said transistors conducting to thereby transmit to said output terminal a signal applied to the base electrode of said first transistor.

References Cited in the file of this patent

UNITED STATES PATENTS

| | | |
|---|---|---|
| 2,278,658 | Kroger | Apr. 7, 1942 |
| 2,403,561 | Smith | July 9, 1946 |
| 2,810,832 | Broadhead | Oct. 22, 1957 |
| 2,881,320 | Goldberg | Apr. 7, 1959 |
| 2,956,175 | Bothwell | Oct. 11, 1960 |
| 2,975,303 | Clapper | Mar. 14, 1961 |